No. 741,936. Patented October 20, 1903.

UNITED STATES PATENT OFFICE.

ERHART SCHLEICHER AND AUGUST DORRER, OF LUDWIGSHAFEN-ON-THE-RHINE, GERMANY, ASSIGNORS TO THE BADISCHE ANILIN UND SODA FABRIK, OF LUDWIGSHAFEN-ON-THE-RHINE, GERMANY, A CORPORATION OF BADEN.

DISAZO COLORING-MATTER.

SPECIFICATION forming part of Letters Patent No. 741,936, dated October 20, 1903.

Application filed July 17, 1903. Serial No. 166,011. (No specimens.)

*To all whom it may concern:*

Be it known that we, ERHART SCHLEICHER, doctor of philosophy, a subject of the Duke of Saxe-Meiningen, and AUGUST DORRER, doctor of philosophy, a subject of the King of Würtemberg, both residing at Ludwigshafen-on-the-Rhine, in the Kingdom of Bavaria, Empire of Germany, have invented new and useful Improvements in Disazo Coloring-Matter, of which the following is a specification.

We have discovered that 1.5 dihydroxynaphthalene will unite with two molecular proportions of a diazotized amido-alphyl-sulfo-acid to form valuable disazo coloring-matters. The amido-alphyl-sulfo-acids which are particularly suited for the purposes of our invention are sulfanilic acid, naphthionic acid, and 2.8 naphthylamin sulfo-acid.

The coloring-matters obtained according to our invention yield, on reduction with stannous chlorid and hydrochloric acid, a brown to brown-yellow body, which is the hydrochlorid of diamido-dihydroxynaphthalene. It is soluble in water when shaken with air, yielding a blue solution. It dissolves in sodium-acetate or sodium-carbonate solution, yielding a blue to blue-violet solution. On triturating it with water containing a little hydrochloric acid and adding a few drops of ferric-chlorid solution to the paste a strong blue coloration is at once formed. The addition of sodium nitrit to the paste produces a yellow-red coloration.

The following table gives some of the properties of the disazo coloring-matters obtained according to our invention:

| | Coloring-matter from one molecular proportion of 1.5 dihydroxynaphthalene and two molecular proportions of diazotized— | | |
|---|---|---|---|
| | Sulfanilic acid. | Naphthionic acid. | 2.8 naphthylamin-sulfo-acid. |
| Color of the aqueous solution. | Red | Violet | Blue-red. |
| Dyes wool from the acid-bath. | Brownish bordeaux. | Violet | Red-violet. |
| Shades become on treatment with potassium bichromate and acetic acid. | Brownish bordeaux. | Violet-black | Red-violet. |

The following examples will serve to further illustrate the nature of our invention, which, however, is not confined to these examples. The parts are by weight.

Example 1: Diazotize one hundred and ninety-five (195) parts of anhydrous sulfanilic-acid sodium salt and remove the free mineral acid from the diazo solution or suspension by means of an excess of sodium acetate. Cool the solution with ice and add thereto one hundred and sixty (160) parts of 1.5 dihydroxynaphthalene in the form of a three (3) per cent. paste. A yellow-red solution of a monoazo coloring-matter results. To this solution add caustic-soda lye in large excess, and then while cooling well with ice add the diazo solution or suspension obtained from a further one hundred and ninety-five (195) parts of anhydrous sulfanilic-acid sodium salt. The solution, which is at first red-violet, becomes blue-violet. When combination is ended, acidify the whole with hydrochloric acid and precipitate the coloring-matter by means of common salt. It dies wool from the acid-bath brownish bordeaux. The monoazo coloring-matter can also be obtained from a solution made alkaline by means of carbonate of soda or caustic soda.

Instead of producing the above coloring-matter in two phases it can be produced in one operation, as explained in the following Example 2.

Example 2: Diazotize one hundred and ninety-five (195) parts of anhydrous sulfanilic-acid sodium salt and add the diazo solution or suspension to an ice-cold solution of eighty (80) parts of 1.5 dihydroxynaphthalene in one thousand (1,000) parts of caustic-soda lye containing thirty-five (35) per cent. of NaOH and ten thousand (10,000) parts of water. The formation of the coloring-matter begins at once and is soon completed. Isolate the coloring-matter as in Example 1.

Example 3: Diazotize two hundred and forty-five (245) parts of anhydrous sodium naphthionate and remove the free mineral acid from the diazo suspension by means of an excess of sodium acetate. Cool the liquid with ice and add thereto a solution of one hundred and sixty (160) parts of 1.5 dihydroxynapthalene and eighty (80) parts of caustic soda in water. A paste of a monoazo coloring-matter results. To this paste add caustic-soda lye in large excess, and then while cooling well with ice add the diazo suspension obtained from a further two hundred and forty-five (245) parts of anhydrous sodium naphthionate. The solution, which is at first blue-violet, becomes pure blue. When combination is ended, precipitate the coloring-matter by means of common salt and purify, if desired, by redissolving it and reprecipitating it. The monoazo coloring-matter can also be obtained from a solution made alkaline by means of carbonate of soda or caustic soda.

Instead of producing the above coloring-matter in two phases it can be produced in one operation, as explained in the following Example 4.

Example 4: Diazotize two hundred and forty-five (245) parts of anhydrous sodium naphthionate and add the diazo suspension to an ice-cold solution of eighty (80) parts of 1.5 dihydroxynaphthalene in one thousand (1,000) parts of caustic-soda lye containing thirty-five (35) per cent. of NaOH and ten thousand (10,000) parts of water. The formation of the coloring-matter begins at once and is soon completed. Isolate the coloring-matter as in Example 3. In place of naphthionic acid in this example the equivalent quantity of 2.8 naphthylamin sulfo-acid can be employed, yielding a coloring-matter of the aforementioned properties.

We claim—

1. Coloring-matter which can be derived from 1.5 dihydroxynaphthalene and two molecular proportions of a hereinbefore-mentioned diazotized amido-alphyl-sulfo-acid, whose aqueous solution is red to violet, which dyes wool from the acid-bath brownish bordeaux to violet, which shades after treatment with potassium bichromate and acetic acid are brownish bordeaux to violet-black; and which on reduction with stannous chlorid and hydrochloric acid yields diamido-dihydroxy-naphthalene.

2. Coloring-matter which can be derived from 1.5 dihydroxynaphthalene and two molecular proportions of diazotized naphthionic acid, whose aqueous solution is violet, which dyes wool from the acid-bath violet, which shades after treatment with potassium bichromate and acetic acid are violet-black; and which on reduction with stannous chlorid and hydrochloric acid yields diamido-dihydroxy-naphthalene.

In testimony whereof we have hereunto set our hands in the presence of two subscribing witnesses.

ERHART SCHLEICHER.
AUGUST DORRER.

Witnesses:
ERNEST F. EHRHARDT,
JOHN L. HEINKE.